350-3.63 SR
2/24/81 OR 4,252,400

United States Patent [19]

Bernal G. et al.

[11] 4,252,400

[45] Feb. 24, 1981

[54] NONDESTRUCTIVE DYNAMIC CONTROLLER FOR THERMOPLASTIC DEVELOPMENT

[75] Inventors: Enrique Bernal G., Minnetonka; Tzuo-Chang Lee, Bloomington, both of Minn.

[73] Assignee: Honeywell Inc., Minneapolis, Minn.

[21] Appl. No.: 932,098

[22] Filed: Aug. 9, 1978

[51] Int. Cl.[3] .......... G03H 1/02

[52] U.S. Cl. .......... 350/3.63; 250/550; 350/162 R; 356/51; 356/355

[58] Field of Search .......... 350/1.1, 3.60, 3.63, 350/3.81, 162 R, 360; 250/338, 352, 550, 572, 474, 476; 356/51, 71, 354, 355, 359

[56] References Cited

U.S. PATENT DOCUMENTS

| | | | |
|---|---|---|---|
| 1,959,233 | 5/1934 | Franke | 356/51 X |
| 3,523,054 | 8/1970 | Heflinger et al. | 350/3.81 X |
| 3,716,359 | 2/1973 | Sheridon | 350/360 X |
| 3,795,514 | 3/1974 | Jvirblis et al. | 350/3.63 X |
| 3,976,354 | 8/1976 | Braitberg et al. | 350/3.63 |
| 3,997,238 | 12/1976 | Oride et al. | 350/3.63 |
| 4,011,009 | 3/1977 | Lama et al. | 350/162 R |
| 4,039,370 | 8/1977 | Kleinknecht | 350/162 R X |
| 4,132,479 | 1/1979 | Dubroeucq et al. | 350/162 R X |
| 4,155,098 | 5/1979 | Roach et al. | 250/550 X |
| 4,180,830 | 12/1979 | Roach | 250/550 X |

FOREIGN PATENT DOCUMENTS

| | | | |
|---|---|---|---|
| 2064702 | 7/1972 | Fed. Rep. of Germany | 250/550 |

*Primary Examiner*—John K. Corbin
*Assistant Examiner*—John D. Lee
*Attorney, Agent, or Firm*—Omund R. Dahle

[57] ABSTRACT

A nondestructive dynamic controller for thermoplastic development is disclosed. The dynamic controller monitors the development of a hologram, without altering the charge pattern on the recording medium that is required for the development. The dynamic controller determines when optimum deformation has occurred in the developing recording medium and provides a signal which is used to shut off the thermal input used in the development.

9 Claims, 10 Drawing Figures

NONDESTRUCTIVE DYNAMIC CONTROLLER FOR THERMOPLASTIC DEVELOPMENT

BACKGROUND AND SUMMARY OF THE INVENTION

This invention lies in the general area of thermoplastic-photoconductive recording. In the U.S. Pat. No. 3,976,354 "Holographic Memory with Moving Memory Medium" issued to Braitberg and Lee, and assigned to the same assignee as the present invention, there is shown a thermoplastic-photoconductive memory medium. Such thermoplastic devices used for optical recording require a sequence of charging and exposure operations for creation of a latent image in the form of a charge distribution on the surface of a thin thermoplastic layer. Development of the image is accomplished by heating the thermoplastic to its softening point whereupon it deforms in a surface relief that reproduces the charge distribution pattern initially on the surface. At the same time that the deformation occurs, the electrical conductivity of the thermoplastic increases in the soft state and the charge has a tendency to leak away. Continued heating of the thermoplastic beyond the point at which charge leaks off results in erasure of the hologram due to surface tension levelling of the electrostatically induced surface relief.

Optimum development of the latent image depends on preservation of the surface charge on the thermoplastic until the deformation is complete. An automatic method of dynamic monitoring of the development is not known prior to this invention. This invention describes apparatus and procedure where a source of infrared light (to which wavelength the photoconductive layer is not photosensitive or responsive) and an infrared detector are used to monitor the development of the surface relief of the thermoplastic during heating, by detecting the first order beam diffracted from the developing grating. A significant aspect of this invention lies in the use of a separate monitoring source operating at a wavelength longer than the longest wavelength at which the sensitized photoconductor layer in the thermoplastic device responds, thereby not interfering with the charge pattern produced on the thermoplastic surface during exposure. The use of a separate monitoring source and detector also allows a placement of this apparatus in a location where neither the source nor the detector interfere with the hologram recording and reconstruction beam paths. The use of the separate monitoring source and detector also allows use of the first order diffracted beam which provides the highest diffraction efficiency, a crucial factor in obtaining sufficient signal-to-noise ratio to provide a suitable control signal for turning off the developing heat source.

DESCRIPTION

The present disclosure teaches apparatus and method for dynamic monitoring of the developing fringes in the thermoplastic-photoconductive holographic camera. This is accomplished by the use of a light (IR) source (to which wavelength the photoconductive film is not sensitive) and a photo-detector directed toward the thermoplastic surface to monitor the deformation of the surface as the development progresses, together with control means to terminate the thermal development at the optimum development. By using a monitoring radiation source to which the recording medium is not responsive or sensitive, the monitoring of the developing surface deformation can be continuous during the developing process without altering the charge pattern on the recording medium.

Figure 1:
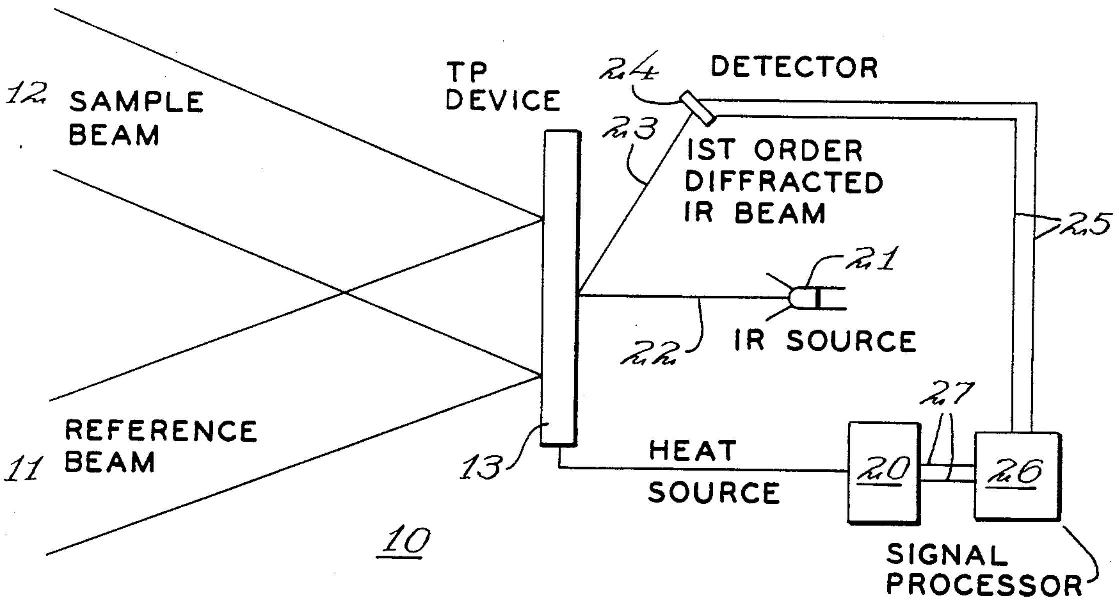
FIG. 1 is a functional block diagram representation of the apparatus of one embodiment of the invention.
Figure 1A:
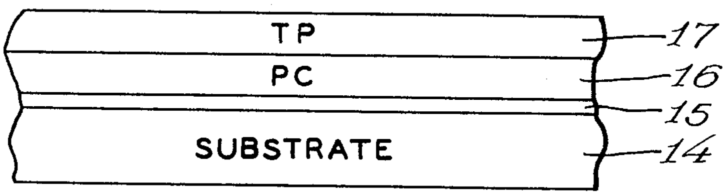
FIG. 1*a* shows a section view of a thermoplastic-photoconductive medium.

In FIG. 1 there is disclosed a portion of a thermoplastic-photoconductive holographic camera 10 in which a reference beam 11 and a sample (or object) beam 12 (mutually coherent) are projected onto a thermoplastic-photoconductive recording medium 13 and a latent image recorded. The medium 13 may be of a known type as shown in section in FIG. 1*a* comprising a transparent base or substrate 14, such as glass, a transparent conductive layer 15, such as indium oxide, a photoconductive layer 16, and a thermoplastic layer 17. In FIG. 1 an electrical source (DC or pulse) 20 is connected to provide a current pulse through the indium oxide conductive layer 15 for heating ($I^2R$) the medium 13 to develop the latent image. Other sources of the heat for thermal development may be used instead, if desired. As mentioned above, thermoplastic devices used for optical recording require a sequence of charging and exposure operations for creation of a latent image in the form of a charge distribution on the surface of a thin thermoplastic layer. Development of the image is accomplished by heating the thermoplastic to its softening point, so that it deforms in a surface relief that reproduces the charge distribution pattern initially on the surface.

Figure 1B:
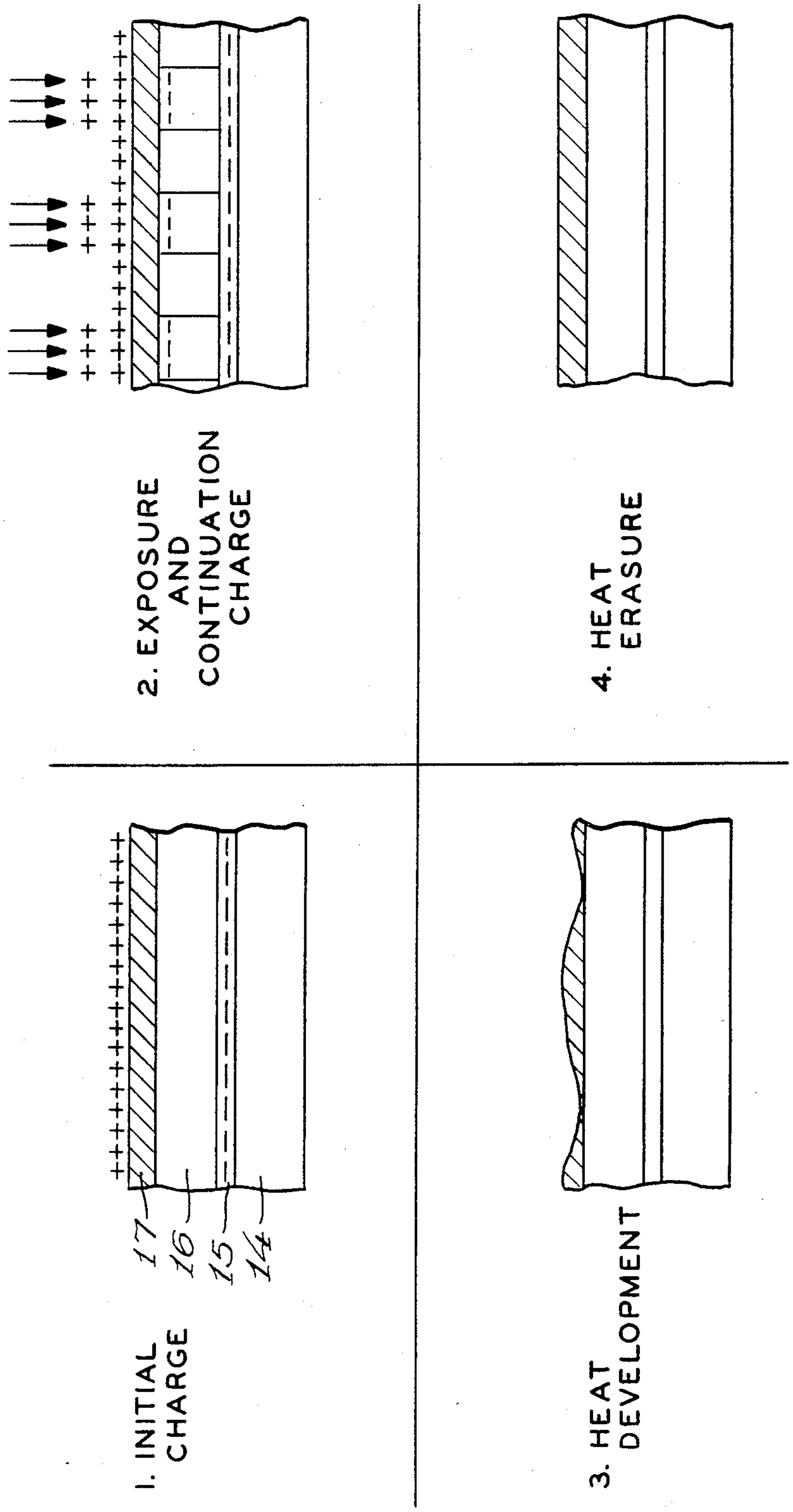
FIG. 1*b* shows steps in the recording and erasing of a thermoplastic medium.

The conventional operational steps for recording and read-out are shown in FIG. 1*b* as follows:

Step 1: The medium is primed with electrostatic charges in the dark, typically by a coronatron.

Step 2: Exposure to the optical image, causing a corresponding charge pattern to reside at the TP-PC interface.

Step 3: Thermal development. The surface forms a topographic pattern in accordance with the electrotstatic charge pattern. The relief image can be read-out nondestructively.

Step 4: Thermal erasure, either longer or more intense heating than during development. The surface is restored to the initial state for reuse. Several thousand write-erase cycles have been demonstrated.

An infrared source 21 directs IR radiation to the medium 13, as shown along a beam 22. A first order diffracted beam 23 from the developing grating (i.e. the developing surface relief) is sensed by an IR detector 24. Thus the source 21 and detector 24 are used to monitor the development of the surface relief of the thermoplastic during heating, by detecting the first order beam diffracted from the developing grating. The detector provides an electrical signal through conductors 25 to a signal processor 26 which through conductors 27 controls the heat source 20 providing optimum development. In a preferred embodiment of the invention a signal processor 26 consists of a threshold detector and a time delay. During the development step, when heating of the medium is occuring by resistive heating of the conductive layer 15 from electrical source 20, the infrared radiation from source 21 is directed onto the thermoplastic surface. As deformation of the thermoplastic surface begins, a first order diffracted beam is received by detector 24, and when the desired threshold signal level is reached, the signal processor operates to switch off the heating current from source 20 either immediately or after a preselected time delay. The threshold level and the time delay can be adjusted to fit the characteristics of the particular thermoplastic being used.

Figure 8:
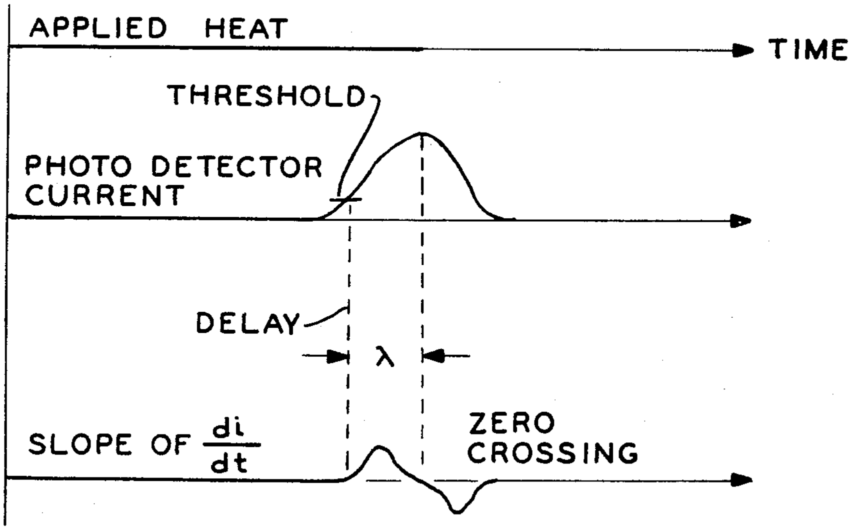
FIG. 8 is a graphical representation of certain signals related to FIG. 1 operation.

In another embodiment of the invention the signal processor 26 may include a slope detector to gauge the progress of the developing surface deformation. This may be in the form of an electronic differentiation (RC) circuit used to measure the slope of the detected signal and seek the zero crossing to terminate the heating. These two embodiments have electrical signals along a time line which are represented graphically in FIG. 8.

An example of the infrared radiation source which may be used in a gallium arsenide (GaAs) or gallium aluminum arsenide (GaAlAs) IR emitting diode, if the photoconductor is sensitized to respond in the visible spectrum. TNF (Trinitro florenone) doped PVK (polyvinyl carbazole) is an example of a suitable photoconductor material. A significant aspect of the invention is the use of a monitoring radiation source of wavelength longer than that at which the sensitized photoconductor responds, so that the monitoring radiation can be directed onto the recording medium surface during development and will not interfere with the electric charge pattern produced during exposure.

The most critical operation in recording with a thermoplastic medium is heat development. If the medium is insufficiently heated, then deformation is inadequate while if it is overheated erasure occurs. The amount of heat required for development is a function not only of the room temperature but also of surface electrostatic voltage, coating thickness, exposure level and cycle history. The dynamic monitoring and feedback loop provided herein eliminates the effects of these variables and therefore drastically improves reproducibility. The dynamic feedback technique relies on irradiating the developing topographic pattern with the IR radiation. A detector is used to monitor the first-order diffracted light which increases with increasing development time, then levels off and finally decreases. The geometrical relationship of the transmitted, reflected, and refracted rays with respect to the incident monitor ray is important in this invention.

Figure 2:
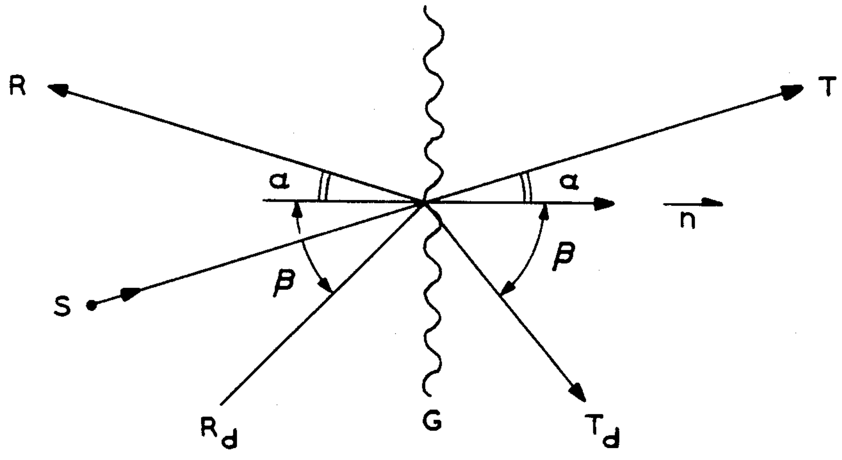
FIG. 2 is a graphical representation of the relation of the incident ray, the grating vector and the sample normal in the special case when they are co-planar.

In FIG. 2 there is shown a special case of monitor geometry wherein the incident ray, the grating vector and the sample normal are co-planar. This simple case will be described before the more general case is considered. The principle of conservation of tangential wave vector is used to find the diffracted ray direction. The momentum matching diagram is constructed in FIG. 3.

A tangential momentum $2\pi/\Lambda$ is imparted to the diffracted ray by the grating G which has a periodicity of $\Lambda$. The magnitudes of the wave vectors T (transmitted), R (reflected) Td and Rd (both diffracted) are equal and given by $2\pi/\Lambda$.

Figure 3:
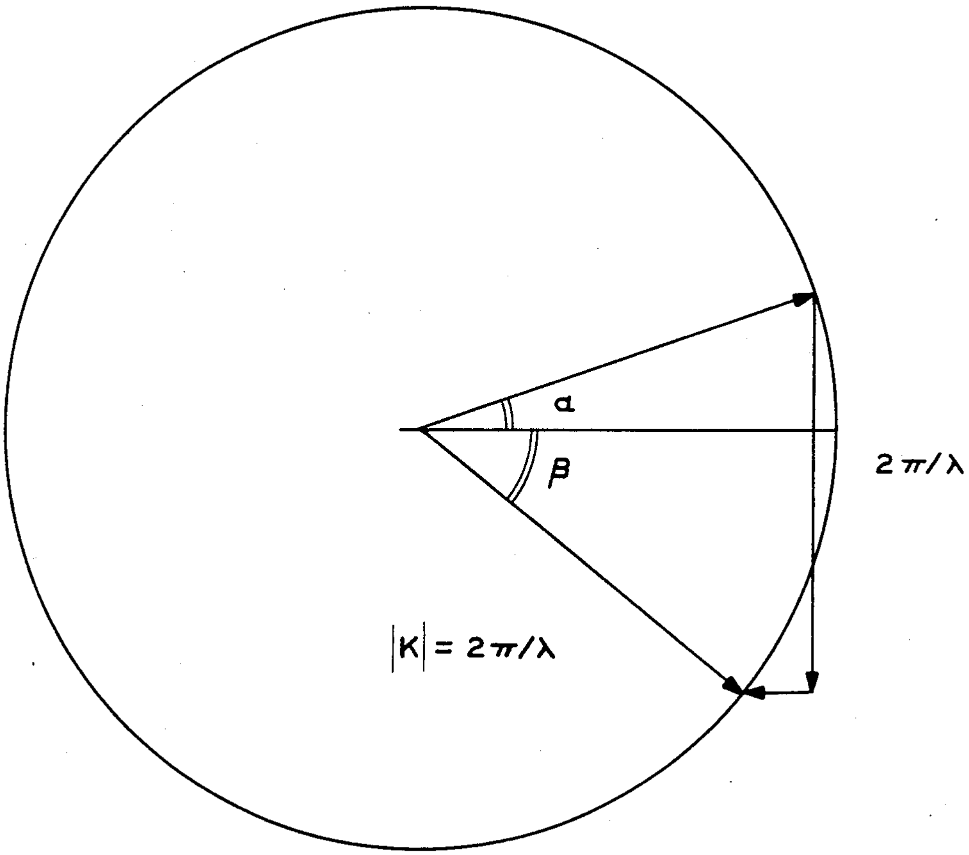
FIG. 3 shows the momentum matching diagram related to FIG. 2.

We obtain from FIG. 3

$$\frac{2\pi}{\lambda}(\sin\alpha + \sin\beta) = \frac{2\pi}{\Lambda} \quad (1)$$

or $$\sin\beta = \frac{\lambda}{\Lambda} - \sin\alpha \quad (2)$$

where $\lambda$ is the read-out light wavelength and $\Lambda$ is the grating spacing. Eq. (1) is of course the well-known grating equation.

If $\alpha$, $\lambda$ and $\Lambda$ are known, then we obtain $\beta$ from Eq. (2).

This co-planer case is of limited interest in constructing the monitoring system in the camera because the LED-detector pair, their mountings and the associated optics can generally not be mounted in a plane without obstructing the field of the holographic recording beams.

Figure 4:
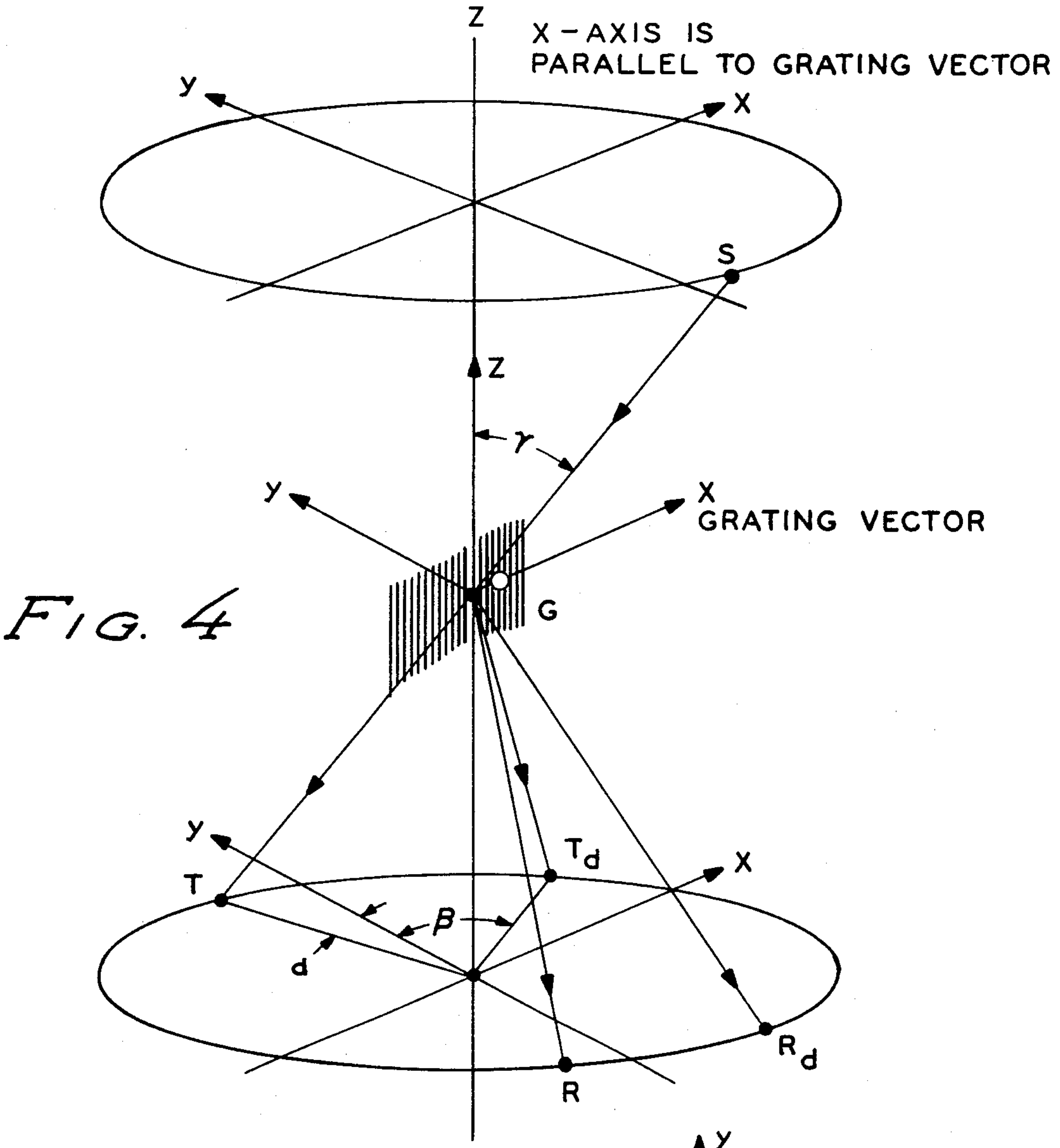
FIG. 4 is a graphical representation of the general case of ray incidences at an arbitrary angle with respect to the grating.
Figure 5:
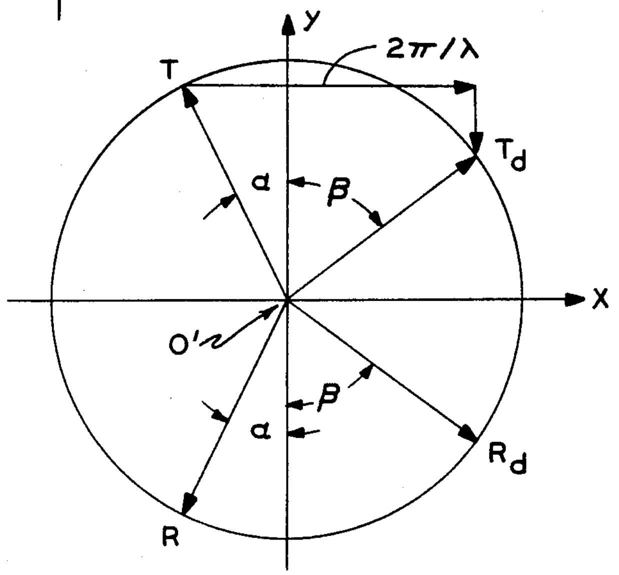
FIG. 5 is a momentum matching diagram related to FIG. 4

Thus we discuss from FIG. 4 the general case where the grating, G, lies in the (x,z) plane with the grating vector along the x direction, and the incident ray, S, forms an angle $\gamma$ with the z-axis. The projection of the incident ray, S, on the (x,y) plane makes an angle $\alpha$ with the y-axis. The projection of the diffracted rays ($OT_d$ and $OR_d$) makes an angle $\beta$ with respect to the y-axis. It is important to note in FIG. 4 that the transmitted, reflected and diffracted rays all lie on the surface of the cone with the apex at point 0. The half-cone angle is $\gamma$. To obtain the direction of the diffracted rays we need to determine $\beta$. We refer to the circle which is the cone projection onto the (x,y) plane, FIG. 5. It can be shown, again by momentum matching, that $$\sin\alpha + \sin\beta = \frac{1}{\sin\gamma}\left(\frac{\lambda}{\Lambda}\right) \quad (3)$$

$$0^\circ < \alpha, \beta < 90^\circ$$

where $\Lambda$ is the spacing of the grating and $\lambda$ is wavelength of the beam radiation.

When $\alpha = 90^\circ$, Eq. (3) is reduced to Eq. (1) fitting for the co-planar case.

In the camera design, $\alpha$ has to be less than 90° so as not to obstruct the field of the recording optical beams. On the other hand $\sin\alpha + \sin\beta$ has to be less than 2, so we want $\sin\gamma$ in Eq. (3) to be as large as possible or $\alpha$ as close to 90° as possible.

As a specific example, since the total field of view of the signal beam is typically less than ±25° with respect to the film normal, we can set $\gamma = 90^\circ - 35^\circ = 55^\circ$. This leads to $$\sin\alpha + \sin\beta = 1.22\left(\frac{\lambda}{\Lambda}\right) \quad (4)$$

Figure 6:
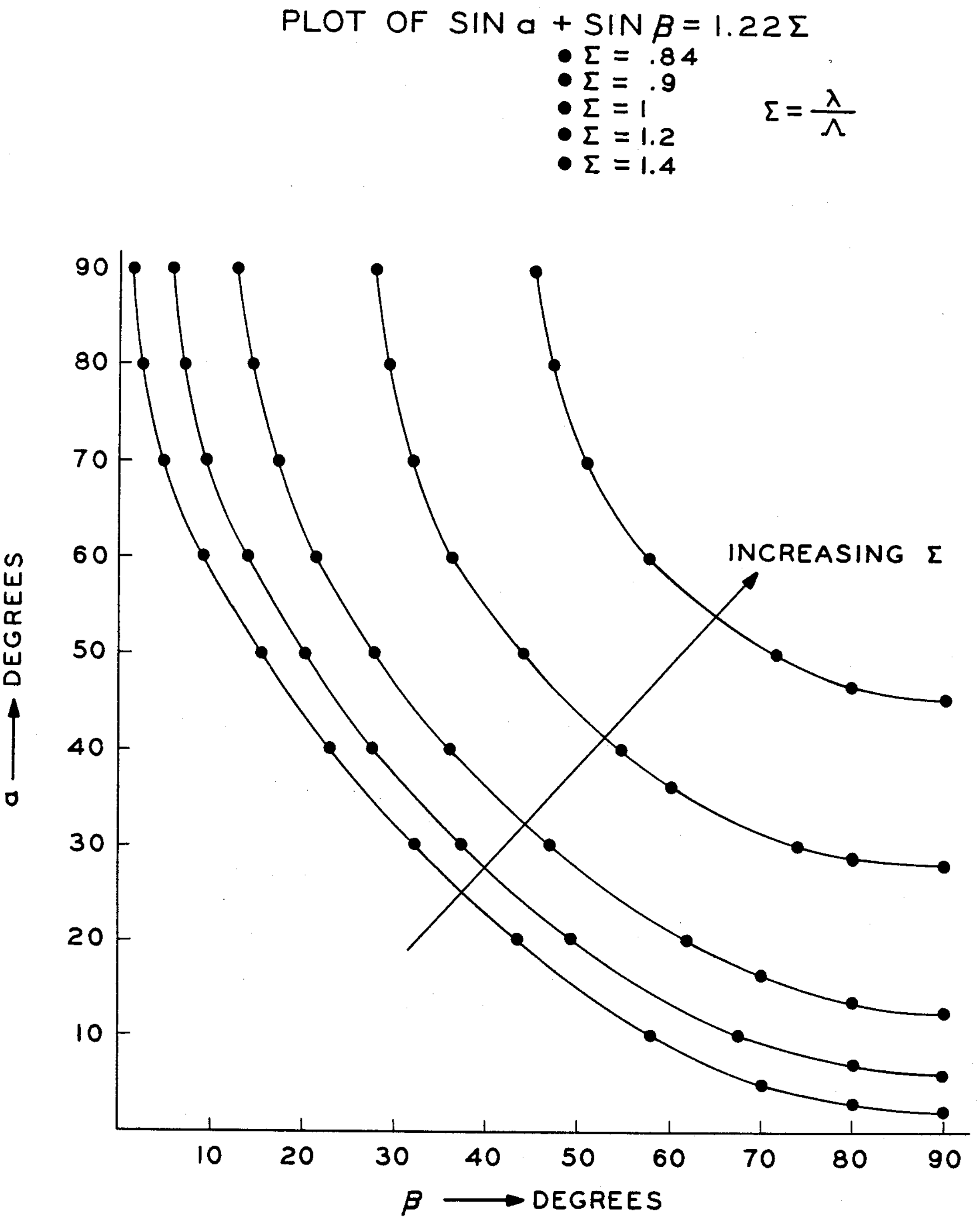
FIG. 6 shows a plot of $\alpha$ vs $\beta$ curves using various parameters for $\lambda/\Lambda$.

$\alpha$ vs $\beta$ is plotted in FIG. 6 based on Eq. (4) using various parameters for $\lambda/\Lambda$. The choices for $\lambda/\Lambda$ is based on the following combinations:

| λ | Λ | Σ = λ/Λ |
|---|---|---|
| .84–.9μm | .84μm | 1–.93 |
| .94–.9μm | 1μm | .94–.9 |
| .91–.97μm | .84μm | 1.08–1.15 |
| .91–.97μm | 1μm | .91–.97 |

λ of 0.84 um corresponds to a spatial frequency of 1200 l/mm while λ of 1 um corresponds to 1000 l/mm.

The 0.84 um to 0.9 um wavelength range pertains to emission halfwidth from a Monsanto GaAs LED type ME7124 while the 0.91 to 0.97 um wavelength range pertains to that from a Fairchild type FPE104 LED.

In one specific embodiment we chose $\gamma$ to be 60° and in this arrangement the LED, detector, mount and associated optics are out of the normal field of view of the holographic recording beams. If we pick a hologram which has a spatial frequency near the peak of the $\theta$ vs spatial frequency curve (30° between beams of 6328 A or 814 lines per millimeter) and set $\alpha=\beta$ we get $\alpha$ and $\beta \simeq 26.3°$ for a $\lambda=0.94$ (FPE 104 GaAs LED). With the LED and detector set at the appropriate positions a good signal has been obtained from a hologram of 814 lines per millimeter. If we hold $\alpha$ constant at 26.3° and look at spatial frequencies 814 ±300 l/mm we find that $\beta$ is 50° and 6.7°, respectively. In this embodiment the optics for the light emitting diodes 21 consist of a single lens (not shown) that images the waist of the IR beam onto the thermoplastic medium, 13. The spot diameter in this instance is about 4 mm.

Figure 7:
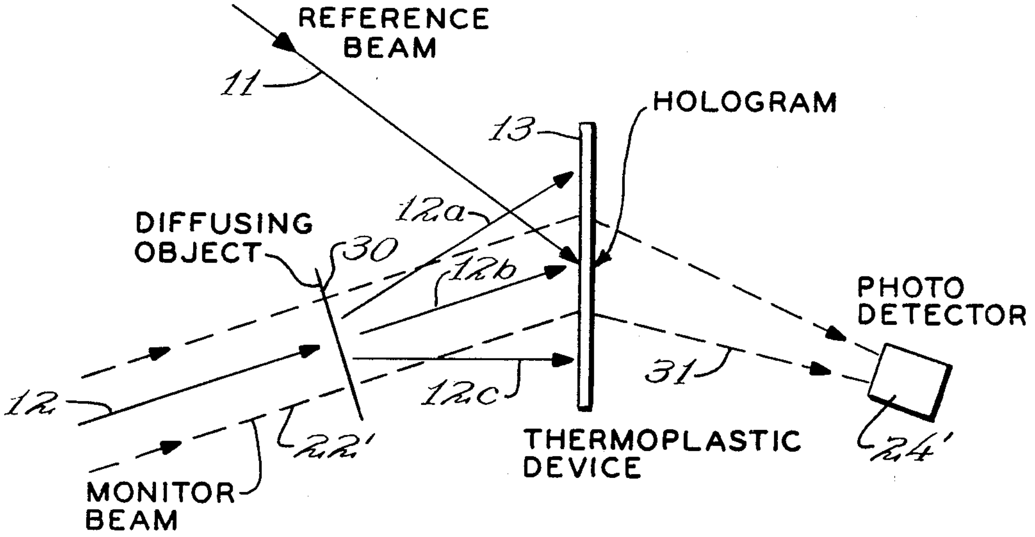
FIG. 7 is a modification of the embodiment shown in FIG. 1.

When a complex hologram is made of a diffusely transmitting or reflecting object, it is important that a large portion of the monitor diffracted light be collected for effective monitoring. To accomplish this two alternatives exist. One is to have the collimated IR beam illuminate the hologram from the same side as the reference beam used in hologram recording and then use large aperture optics to collect the first order diffusing beam. This method is relatively cumbersome because of the need for large aperture light collection optics. The other alternative is have the collimated monitor beam illuminate the hologram from the same side as the object beam used in hologram recording (a top view of this arrangement is shown in FIG. 7) and the diffracted monitor beam will converge to form a real image which is made to fall on the detector. This will eliminate the need to use cumbersome light collecting optics for light collection. Referring now to FIG. 7, which is a modification of the embodiment shown and described in FIG. 1, again the reference beam 11 (coming from the upper left) and the object or sample beam 12 (coming from the lower left) are shown in solid lines, the object or sample beam traversing a diffusing object 30 and the resulting diffusing rays 12*a*, 12*b*, 12*c* being shown approaching the thermoplastic recording medium 13. The collimated monitor beam 22 shown by dashed lines may be considered as approaching the thermoplastic recording medium (the hologram) from an angle not in the plane of the paper (i.e. from an elevated position above the plane of the paper), so that the monitor beam does not traverse the diffusing object in reaching the hologram. The resulting diffracted monitor beam 31, shown by dashed lines to the right of the hologram, converges to fall on the monitor photodetector 24 without the necessity of light collecting optics.

The embodiments of the invention in which an exclusive property or right is claimed are defined as follows:

1. Apparatus for dynamically controlling the development of a thermoplastic-photoconductive recording medium, comprising:

- a thermoplastic-photoconductive recording medium;
- means for heating said thermoplastic medium to develop an image to which the medium has been exposed;
- a source of monitoring radiation of a wavelength to which the thermoplastic-photoconductive recording medium is insensitive, said source of monitoring radiation being directed onto the surface of said recording medium during development of the image, said source of radiation producing a first order diffracted beam from the developing image;
- photo detector means positioned to receive said first order diffracted beam and to provide an electrical signal in response thereto; and,
- signal processing means connected to receive the electrical signal from said photo detector means and to subsequently control the means for heating the thermoplastic medium.

2. The apparatus of claim 1 in which the signal processing means comprises a threshold detector for responding to the photo detector electrical signal at a predetermined threshold signal level.

3. The apparatus of claim 2 in which the signal processing means further includes time delay means for delaying the turn-off of said means for heating for a predetermined time after said threshold signal level is reached.

4. The apparatus of claim 1 in which the signal processing means comprises means for sensing the slope of the electrical signal from said photo detector means and means for turning off said means for heating when a zero crossing of the sensed slope occurs.

5. The apparatus of claim 1 in which the photoconductive medium is trinitrofluorenone (TNF) doped polyvinylcarbazole (PVK), the source of monitoring radiation is a GaAs or GaAlAs light emitting diode, and the photo detector means in a silicon p-n junction.

6. The apparatus of claim 1 in which said recording medium has a photoconductive layer which is photoresponsive in the visible light spectrum but not in the infrared spectrum, and in which the source of monitoring radiation is in the infrared spectrum, so that the infrared monitoring light does not affect the image recorded on the recording medium.

7. The apparatus of claim 1 and further comrpising means for recording a latent electrostatic image on said medium.

8. In a system of the type including a thermoplastic-photoconductive recording medium and including means for recording a latent electrostatic image on the medium and including means for heating the thermoplastic medium to develop the image, apparatus for dynamically controlling the development comprising:

- a source of monitoring radiation of a wavelength to which the thermoplastic-photoconductive recording medium is insensitive, said source of monitoring radiation being directed onto the surface of said recording medium during development of the image, said source of radiation producing a first order diffracted beam from the developing image;
- photo detector means positioned to receive said first order diffracted beam and to provide an electrical signal in response thereto; and,
- signal processing means connected to receive the electrical signal from said photo detector means and to subsequently control the means for heating the thermoplastic medium.

9. The apparatus of claims 7 or 8 in which the means for recording the latent image includes a diffusing object in the path of the object beam whereby the object beam approaching the recording medium has some diffusing rays, the source of monitoring radiation is directed to the surface of the recording medium from the same side as the object beam in order that the diffracted monitor beam converges to form a real image on said photo detector means without the use of light collecting optics in the diffracted monitor beam path.

* * * * *